US007393148B2

(12) United States Patent  (10) Patent No.: US 7,393,148 B2
Allen et al.  (45) Date of Patent: Jul. 1, 2008

(54) OPTICAL FIBER SPLICING CLOSURES AND METHODS

(75) Inventors: Barry Wayne Allen, Siler City, NC (US); Erik David Bishop, Fuquay-Varina, NC (US)

(73) Assignee: Tyco Electronics Corporation, Middletown, PA (US)

( * ) Notice: Subject to any disclaimer, the term of this patent is extended or adjusted under 35 U.S.C. 154(b) by 1 day.

(21) Appl. No.: 11/561,761

(22) Filed: Nov. 20, 2006

(65) Prior Publication Data

US 2007/0127875 A1 Jun. 7, 2007

Related U.S. Application Data

(60) Provisional application No. 60/742,768, filed on Dec. 6, 2005.

(51) Int. Cl.
*G02B 6/255* (2006.01)
(52) U.S. Cl. .............................. 385/99; 385/95
(58) Field of Classification Search ............... 385/95, 385/99
See application file for complete search history.

(56) References Cited

U.S. PATENT DOCUMENTS 3,992,569 A * 11/1976 Hankins et al. ............ 174/92

(Continued)

FOREIGN PATENT DOCUMENTS

DE  19639184 A1  3/1998

(Continued)

OTHER PUBLICATIONS

International Search Report and the Written Opinion of the International Searching Authority for PCT Application No. PCT/US2006/046178, mailed Apr. 27, 2007.

(Continued)

*Primary Examiner*—Ellen E. Kim
(74) *Attorney, Agent, or Firm*—Myers Bigel Sibley & Sajovec, P.A.

(57) ABSTRACT

A splice enclosure assembly is provided for enclosing a splice between first and second fiber optic cables, the first and second fiber optic cables each having a jacket, an elongate optical fiber and at least one flexible, elongate strength member extending through the jacket. The splice enclosure assembly includes an elongate bridge member and an elongate cover member. The elongate bridge member has first and second opposed ends. The bridge member defines a channel extending axially between the first and second ends. The elongate bridge member includes an intermediate portion and first and second strain relief coupling structures. The intermediate portion is disposed between the first and second ends and has an intermediate portion of the channel defined therein. The bridge member is configured to receive the first and second fiber optic cables in the channel such that the splice is disposed in the intermediate portion of the channel. The first and second strain relief coupling structures are located on opposed sides of the intermediate portion. The first and second strain relief coupling structures are configured to engage and secure the strength members of the first and second fiber optic cables to the bridge member and thereby mechanically couple the first and second fiber optic cables to one another and to the bridge member. The elongate cover member is configured to surround the bridge member, the first and second fiber optic cables and the splice when the first and second fiber optic cables are disposed in the channel and the strength members of the first and second fiber optic cables are engaged with the first and second strain relief coupling structures.

25 Claims, 9 Drawing Sheets

U.S. PATENT DOCUMENTS

| | | | | |
|---|---|---|---|---|
| 4,063,793 | A * | 12/1977 | Judd | 439/588 |
| 4,516,830 | A * | 5/1985 | Guazzo | 385/99 |
| H595 | H * | 3/1989 | Lafaw | 385/95 |
| 4,815,810 | A | 3/1989 | Betzler et al. | |
| 4,846,545 | A | 7/1989 | Estabrook et al. | |
| 5,125,060 | A * | 6/1992 | Edmundson | 385/100 |
| 5,185,844 | A * | 2/1993 | Bensel et al. | 385/135 |
| 5,210,812 | A * | 5/1993 | Nilsson et al. | 385/100 |
| 5,440,665 | A | 8/1995 | Ray et al. | 385/135 |
| 5,528,718 | A * | 6/1996 | Ray et al. | 385/136 |
| 5,633,969 | A * | 5/1997 | Jennings et al. | 385/62 |
| 5,657,413 | A | 8/1997 | Ray et al. | 385/139 |
| 5,711,066 | A * | 1/1998 | Castaldo | 29/855 |
| 6,466,725 | B2 * | 10/2002 | Battey et al. | 385/135 |
| 6,856,748 | B1 * | 2/2005 | Elkins et al. | 385/135 |
| 7,171,101 | B2 * | 1/2007 | Gould et al. | 385/135 |
| 2003/0103750 | A1 | 6/2003 | Laporte et al. | 385/134 |
| 2004/0114874 | A1 | 6/2004 | Bono et al. | 385/53 |
| 2004/0120656 | A1 | 6/2004 | Banas et al. | 385/86 |
| 2004/0123998 | A1 | 7/2004 | Berglund et al. | 174/92 |
| 2004/0126069 | A1 | 7/2004 | Jong et al. | 385/189 |
| 2004/0252960 | A1 | 12/2004 | Battey et al. | 385/135 |
| 2004/0264893 | A1 * | 12/2004 | Cooke et al. | 385/99 |
| 2005/0111799 | A1 | 5/2005 | Cooke et al. | 385/100 |
| 2005/0111800 | A1 | 5/2005 | Cooke et al. | 385/100 |
| 2005/0129375 | A1 | 6/2005 | Elkins et al. | 385/100 |
| 2005/0145522 | A1 | 7/2005 | Bloodworth et al. | 206/409 |
| 2005/0163448 | A1 | 7/2005 | Blackwell, Jr. | 385/135 |
| 2005/0175307 | A1 | 8/2005 | Battey et al. | 385/135 |
| 2005/0175308 | A1 | 8/2005 | Elkins, II et al. | 385/135 |
| 2005/0180705 | A1 | 8/2005 | Elkins, II et al. | 385/100 |
| 2005/0185910 | A1 | 8/2005 | Zimmel | 385/135 |
| 2005/0207711 | A1 | 9/2005 | Vo et al. | 385/94 |
| 2005/0244112 | A1 * | 11/2005 | Bugaud et al. | 385/99 |
| 2006/0072884 | A1 * | 4/2006 | Yamauchi et al. | 385/98 |
| 2006/0165352 | A1 * | 7/2006 | Caveney et al. | 385/87 |

FOREIGN PATENT DOCUMENTS

| | | |
|---|---|---|
| EP | 0408244 A2 | 1/1991 |
| WO | WO 98/36301 A1 | 8/1998 |
| WO | WO 01/77729 A1 | 10/2001 |

OTHER PUBLICATIONS

Corning Cable Systems LLC, "OptiSheath™ Advantage Sealed Terminal (UCA4-xx & UCA5-xx)", Published Feb. 2006.

"Tyco Electronics Recordsplice" brochure (2005), 2 pages.

"PLP Preformed Line Products Fiberlign® Splice Housing," manual, Aug. 1994, 2 pages.

Photograph of PLP Preformed Line Products Fiberlign® Splice Housing, 1 page. (admitted prior art) 1994.

* cited by examiner

OPTICAL FIBER SPLICING CLOSURES AND METHODS

RELATED APPLICATION(S)

The present application claims the benefit of and priority from U.S. Provisional Patent Application Ser. No. 60/742,768, filed Dec. 6, 2005, the disclosure of which is incorporated herein by reference in its entirety.

FIELD OF THE INVENTION

The present invention relates to communication cable splices and, more particularly, to enclosures for optical fiber splices and methods for enclosing optical fiber splices.

BACKGROUND OF THE INVENTION

Fiber optic cables or cords are widely used for telecommunications applications where high information capacity, noise immunity and other advantages of optical fibers may be exploited. It is often necessary or desirable to splice two segments of fiber optic cable to one another. Commonly, the splice environment and/or application necessitates that a protective enclosure, such as a splice tray, be provided to protect the splice.

SUMMARY OF THE INVENTION

According to embodiments of the present invention, a splice enclosure assembly is provided for enclosing a splice between first and second fiber optic cables, the first and second fiber optic cables each having a jacket and an elongate optical fiber and at least one flexible, elongate strength member extending through the jacket. The splice enclosure assembly includes an elongate bridge member and an elongate cover member. The elongate bridge member has first and second opposed ends. The bridge member defines a channel extending axially between the first and second ends. The elongate bridge member includes an intermediate portion and first and second strain relief coupling structures. The intermediate portion is disposed between the first and second ends and has an intermediate portion of the channel defined therein. The bridge member is configured to receive the first and second fiber optic cables in the channel such that the splice is disposed in the intermediate portion of the channel. The first and second strain relief coupling structures are located on opposed sides of the intermediate portion. The first and second strain relief coupling structures are configured to engage and secure the strength members of the first and second fiber optic cables to the bridge member and thereby mechanically couple the first and second fiber optic cables to one another and to the bridge member. The elongate cover member is configured to surround the bridge member, the first and second fiber optic cables and the splice when the first and second fiber optic cables are disposed in the channel and the strength members of the first and second fiber optic cables are engaged with the first and second strain relief coupling structures.

According to some embodiments, the first and second strain relief coupling structures each include a plurality of teeth defining a plurality of slots configured to receive portions of the strength members of the first and second fiber optic cables when the strength members of the first and second fiber optic cables are wound about the bridge member.

According to some embodiments of the present invention, an enclosed splice assembly includes first and second fiber optic cables, a splice, an elongate bridge member, and an elongate cover member. The first and second fiber optic cables each have a jacket and an elongate optical fiber and at least one flexible, elongate strength member extending through the jacket. The splice is between the optical fibers of the first and second fiber optic cables. The elongate bridge member has first and second opposed ends. The bridge member defines a channel extending axially between the first and second ends. The bridge member includes an intermediate portion and first and second strain relief coupling structures. The intermediate portion is disposed between the first and second ends and has an intermediate portion of the channel defined therein. The first and second fiber optic cables and the splice are positioned in the channel such that the splice is disposed in the intermediate portion of the channel. The first and second strain relief coupling structures are located on opposed sides of the intermediate portion. The strength members of the first and second fiber optic cables engage the first and second strain relief coupling structures, respectively, to secure the first and second fiber optic cables to the bridge member and thereby mechanically couple the first and second fiber optic cables to one another and to the bridge member. The elongate cover member surrounds the bridge member, the first and second fiber optic cables and the splice.

According to some embodiments of the present invention, a method is provided for forming an enclosed splice assembly joining first and second fiber optic cables, the first and second fiber optic cables each having a jacket and an elongate optical fiber and at least one flexible, elongate strength member extending through the jacket. The method includes: providing an elongate cover member and an elongate bridge member, the bridge member having first and second opposed ends, defining a channel extending axially between the first and second ends and including an intermediate portion disposed between the first and second ends, an intermediate portion of the channel defined therein, and first and second strain relief coupling structures located on opposed sides of the intermediate portion; forming a splice between the optical fibers of the first and second fiber optic cables; positioning the splice and the first and second fiber optic cables in the channel of the bridge member such that the splice is disposed in the intermediate portion of the channel; engaging the strength members of the first and second fiber optic cables with the first and second strain relief coupling structures, respectively, to secure the first and second fiber optic cables to the bridge member and thereby mechanically couple the first and second fiber optic cables to one another and to the bridge member; and placing the an elongate cover member over the bridge member, the first and second fiber optic cables and the splice.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Well-known functions or constructions may not be described in detail for brevity and/or clarity.

Figure 11:
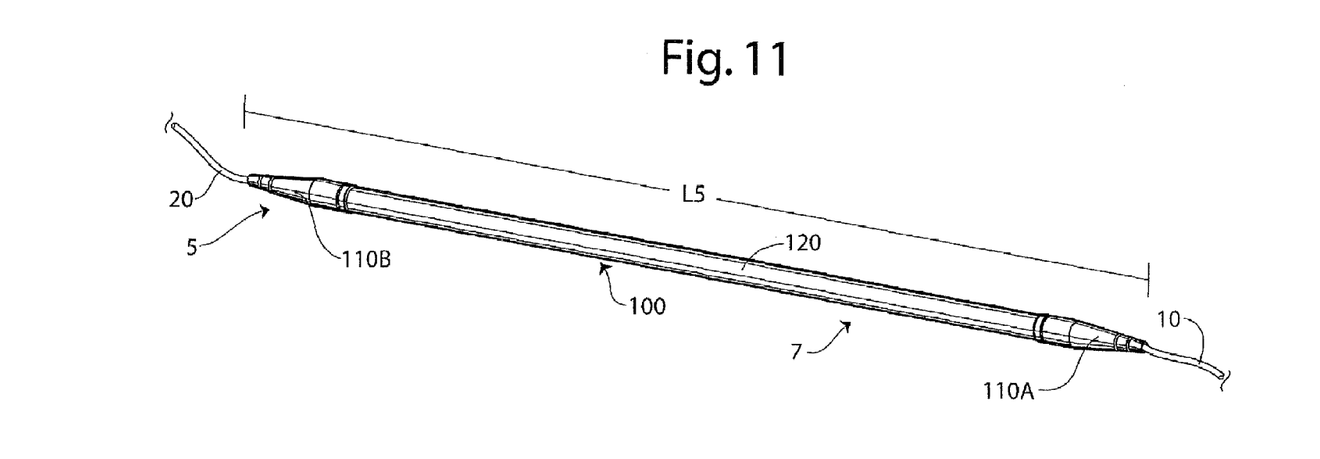
FIG. 11 is a perspective view of the enclosed splice assembly of FIG. 1.

With reference to FIG. 11, an enclosure assembly 100 according to some embodiments of the present invention is shown therein. The enclosure assembly 100 can be used to protect an optical fiber splice and couple a fiber optic cable or cord 10 with a fiber optic cable or cord 20 to form a cordage assembly 7 including an enclosed splice assembly 5. According to some embodiments, the enclosure assembly 100 includes strain relief between the cords 10, 20 across the splice. According to some embodiments, the enclosure assembly 100 is re-enterable and reusable, for example, to inspect, repair, or replace the splice. The enclosure assembly 100 may present a smaller and/or more manageable profile than conventional enclosures. The enclosure assembly 100 may require less craft skill than conventional enclosure techniques. The enclosure assembly 100 may be provided as an enclosure kit 102 as shown in FIG. 1 that can be assembled as described herein to form the enclosure assembly 100.

Figure 12:
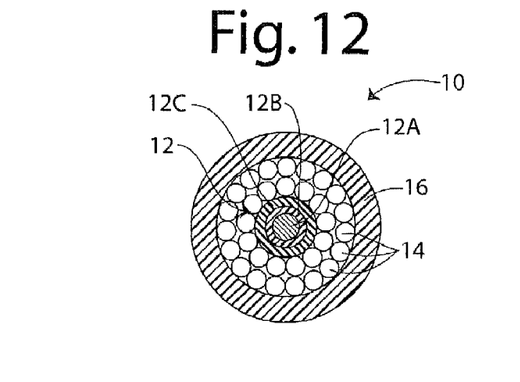
FIG. 12 is a longitudinal center cross-sectional view of the first cord of FIG. 1.

Turning to the enclosed splice assembly 5 in more detail, the cord 10 includes an optical fiber 12, one or more strength members or yarns 14, and a surrounding jacket 16 (FIG. 12). The fiber 12 has a free end. The optical fiber 12 may be, for example, a tight buffered fiber (e.g., having a total outer diameter of about 900 μm) or a loose tube fiber. According to some embodiments, the optical fiber 12 includes a glass optical fiber 12A having a coating layer 12B, and may further include a buffer layer 12C surrounding the coating layer 12B. The strength members 14 are flexible and elongate. The strength members 14 may be yarns of aramid (e.g., Kevlar yarn), for example. The jacket 16 may be formed of a suitable polymeric material, such as PVC. The second cord 20 may be constructed in the same manner as the first cord 10.

Figure 1:
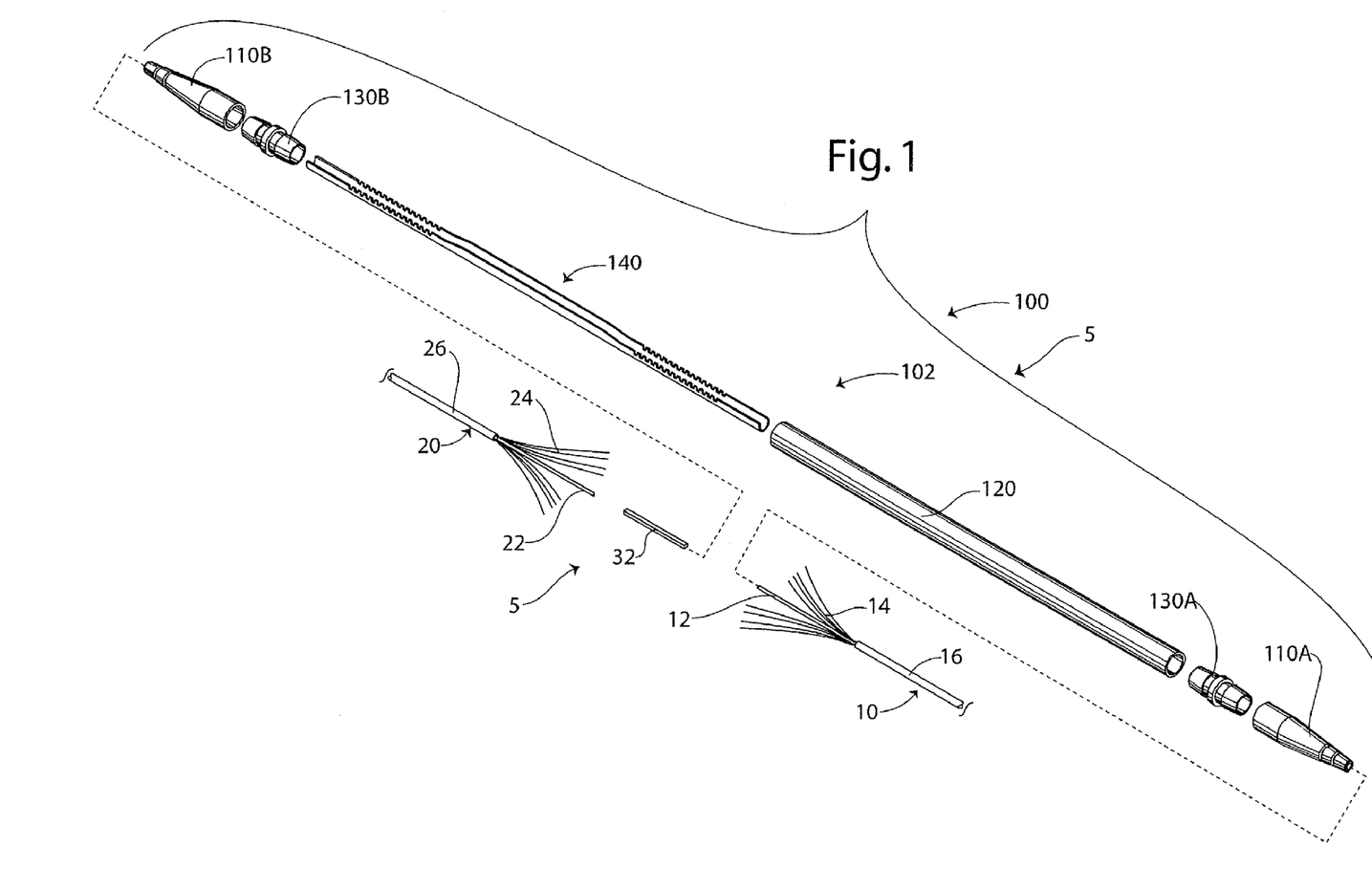
FIG. 1 is an exploded, perspective view of an enclosed splice assembly including an enclosure kit and first and second fiber optic cords according to some embodiments of the present invention.
Figure 9:
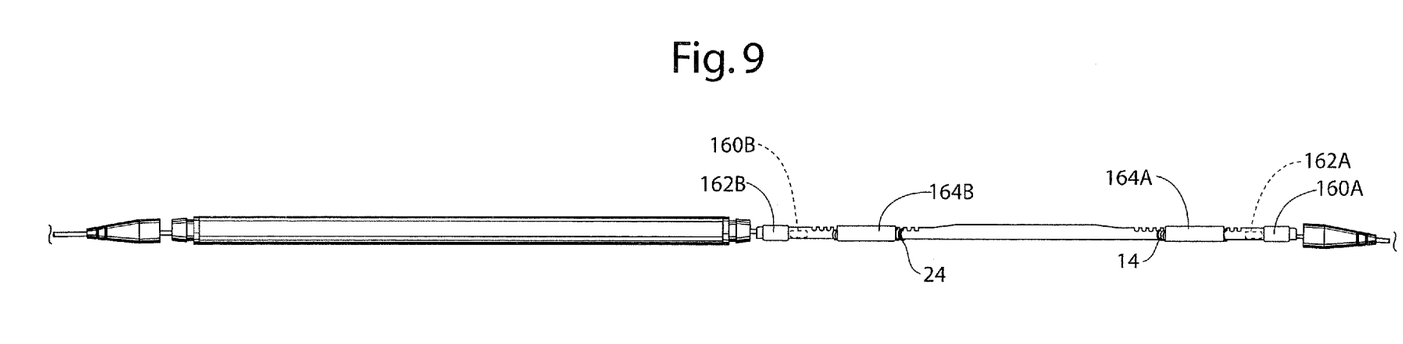

As seen in FIG. 1, the illustrated enclosure kit 102 includes a pair of end boots 110A, 110B, an elongate tubular cover member 120, a pair of coupling members 130A, 130B, an elongate bridge member 140, and a plurality of tape pieces 160A, 160B, 162A, 162B, 164A, 164B (FIG. 9). Each of these components will be described in more detail below.

Figure 13:
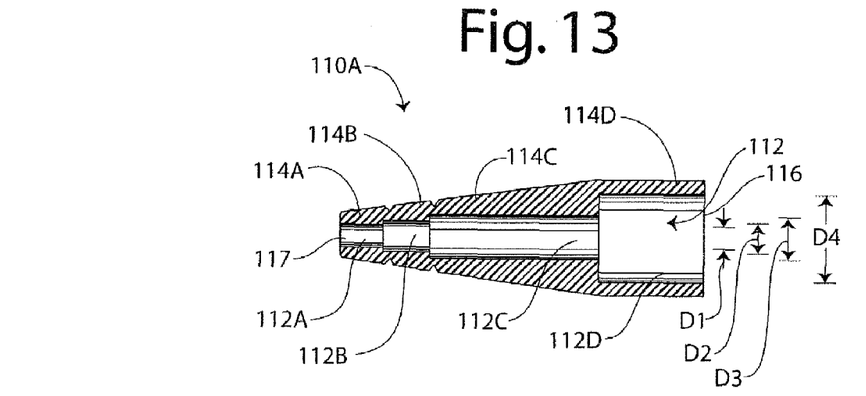
FIG. 13 is a longitudinal center cross-sectional view of an end boot forming a part of the enclosure kit of FIG. 1.

With reference to FIGS. 1 and 13, the end boots 110A, 110B may be constructed in the same manner and, therefore, only the boot 110A will be described herein in detail, it being understood that this description likewise applies to the boot 110B. The boot 110A has a tapered outer profile. According to some embodiments, the outer profile of the boot 110A is frusto-conical. According to some embodiments, the angle of the taper of the boot 110A is between about 3 and 9 degrees.

Referring to FIG. 13, the boot 110A defines a boot passage 112 communicating with opposed end openings 116, 117. The passage 112 has four sections 112A, 112B, 112C, 112D having different diameters within four corresponding boot sections 114A, 114B, 114C, 114D, respectively, of the boot 110A. More particularly, the passage section 112B has a greater diameter D2 than the diameter D1 of the passage section 112A, the passage section 112C has a diameter D3 greater than the diameter of D2, and the passage section 112D has a diameter D4 that is greater than the diameter D3. According to some embodiments, the diameter D1 is between about 0.068 and 0.095 inch, the diameter D2 is between about 0.084 and 0.10, and the diameter D3 is between about 0.115 and 0.135 inch. According to some embodiments, the diameter D4 is sized to receive the coupling member 130A to form a releasable interference fit therewith.

The boots 110A, 110B may be formed of any suitable material. According to some embodiments, the boots 110A, 110B are formed of a flexible, elastomeric material. According to some embodiments, the boots 110A, 110B are formed of PVC, santoprene, silicone, neoprene, EPDM, or PPV. According to some embodiments, the boots 110A, 110B are formed of a material having a durometer of between about 50 and 90 Shore A. The boots 110A, 110B may be formed using any suitable technique. According to some embodiments, the boots 110A, 110B are molded.

Figure 14:
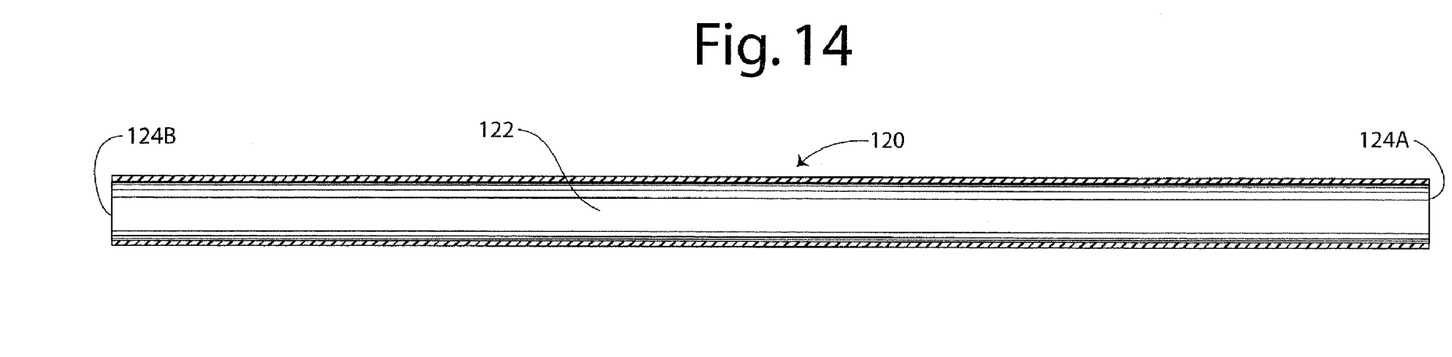
FIG. 14 is a longitudinal center cross-sectional view of a tubular cover member forming a part of the enclosure kit of FIG. 1.

With reference to FIGS. 1 and 14, the tubular cover member 120 defines a lengthwise passage 122 communicating with opposed end openings 124A, 124B. According to some embodiments, the cover member 120 is oval in cross-section and, according to some embodiments, circular in cross-section. According to some embodiments, the cover member 120 has a substantially smooth outer surface from end to end. According to some embodiments, the cover member 120 is unitary and, according to some embodiments, is unitarily formed such as by molding or extruding as a tube.

The cover member 120 may be formed of any suitable material. According to some embodiments, the cover member 120 is formed of a semi-rigid polymeric material. According to some embodiments, the cover member 120 is formed of a material having a durometer of between about 30 and 60 Shore D. According to some embodiments, the cover member 120 is formed of PVC, polyethylene, polypropylene, and/or nylon. The cover member 120 may be formed using any suitable technique such as molding or extrusion. According to some embodiments, the cover member is unitarily formed.

Figure 15:
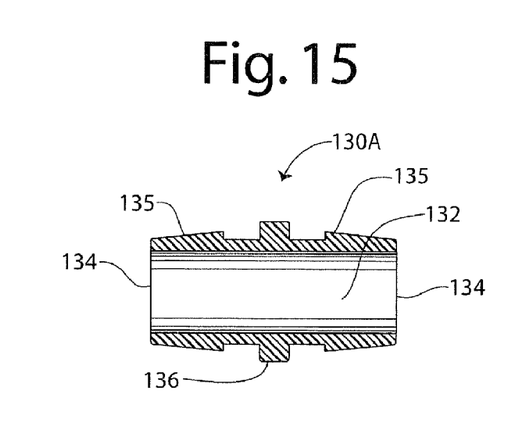
FIG. 15 is a cross-sectional view of a coupling member forming a part of the enclosure of kit of FIG. 1.

With reference to FIGS. 1 and 15, the coupling members 130A, 130B may be constructed in the same manner and therefore only the coupling member 130A will be described herein, it being understood that this description likewise applies to the coupling member 130B. The coupling member 130A defines a passage 132 communicating with opposed end openings 134. According to some embodiments, the passage 132 (including its opposed end openings) has a nominal diameter at least as great as the maximum diameter of a splice protection device (e.g., the device 32 or a heat shrink tubing sleeve) to be mounted on the cords 10, 20 and in the enclosure assembly 100. According to some embodiments, the nominal diameter of the passage 132 is between about 0.187 and 0.312 inch. Opposed frusto-conical barb sections 135 are formed on the exterior of the coupling member 130A. The barb sections 135 taper inwardly in the direction of the respective adjacent openings 134. A circumferential flange 136 separates the barb sections 135.

The coupling members 130A, 130B may be formed of any suitable material. According to some embodiments, the coupling members 130A, 130B are formed of a rigid polymeric material. According to some embodiments, the coupling members 130A, 130B are formed of a material having a durometer of between about 70 and 90 Shore D. According to some embodiments, the coupling members 130A, 130B are formed of POM, polycarbonate, nylon, PBT, ABS, or ABS alloy. The coupling members 130A, 130B maybe formed using any suitable technique, such as molding.

Figure 16:
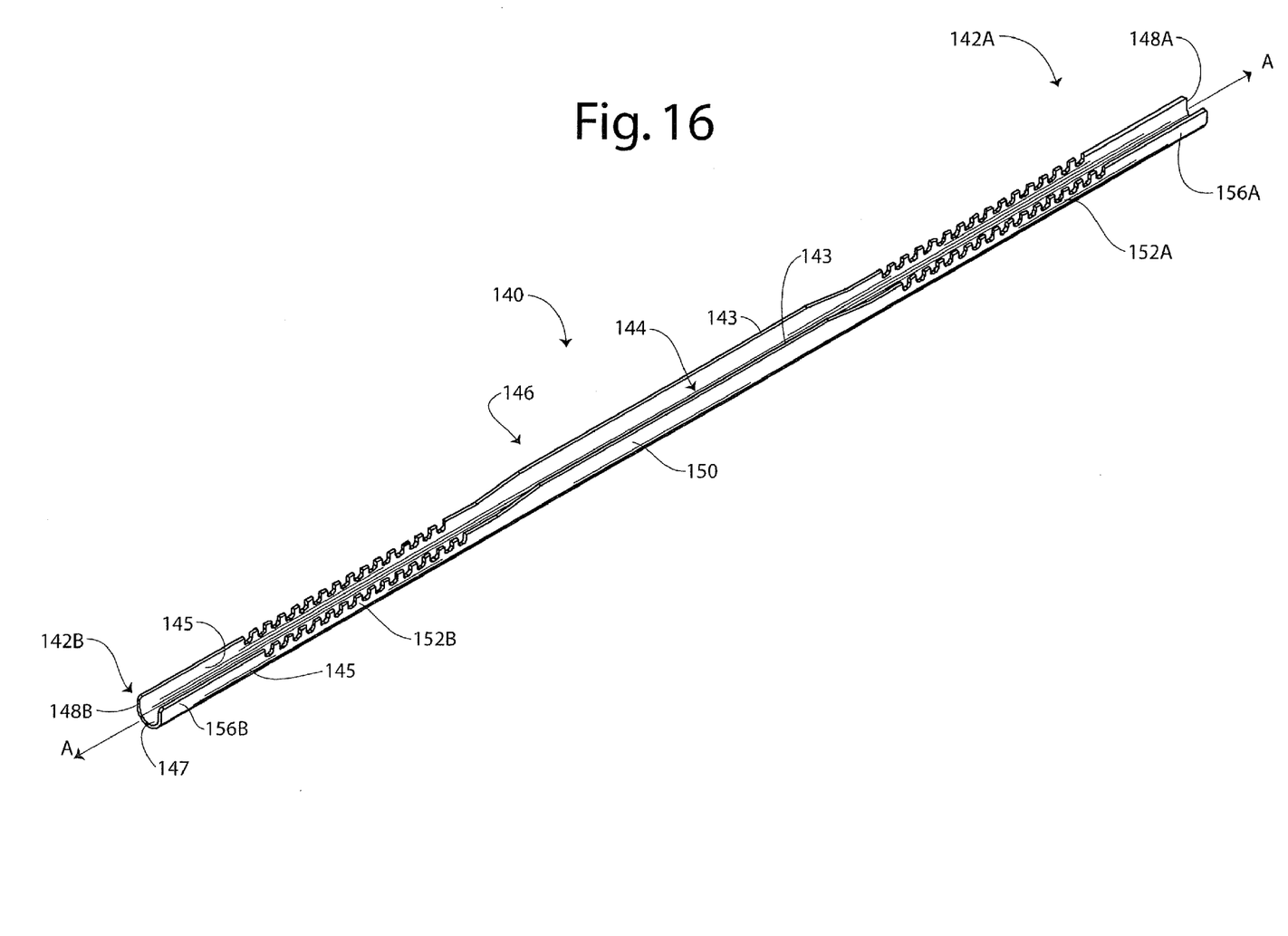
FIG. 16 is a perspective view of a bridge member forming a part of the enclosure of kit of FIG. 1.
Figure 17:
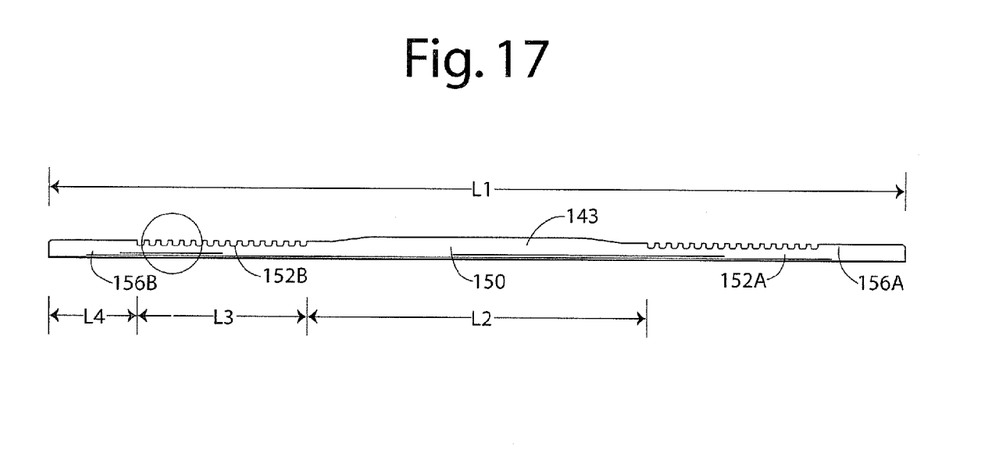
FIG. 17 is a side elevational view of the bridge member of FIG. 16.
Figure 18:
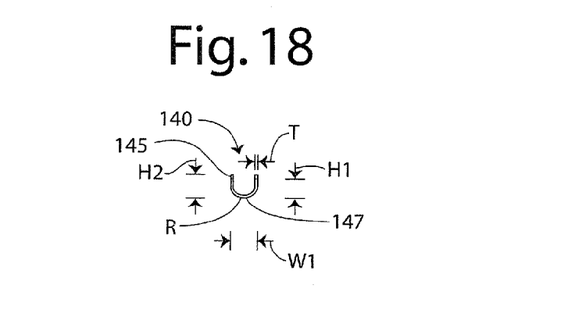
FIG. 18 is an end view of the bridge member of FIG. 16.

With reference to FIGS. 1 and 16-19, the bridge member 140 is a generally elongate member extending along an axis A-A and having opposed ends 142A, 142B. The bridge member 140 is generally semi-tubular or U-shaped in cross-section (transverse and generally perpendicular to the axis A-A) so as to define a longitudinal U-shaped channel 144 communicating with a longitudinal sideward or top opening 146 and opposed end openings 148A, 148B. According to some embodiments and as shown, the bridge member includes opposed, spaced apart, axially extending side walls 145 connected along their lower edges by an arcuate, axially extending bottom wall 147 (FIGS. 16 and 18).

Figure 19:
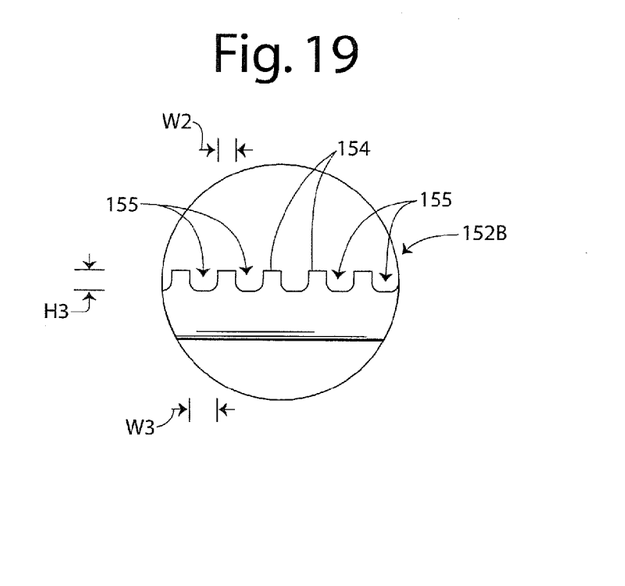
FIG. 19 is an enlarged, fragmentary view of a strain relief coupling section forming a part of the bridge member of FIG. 16.

The bridge member 140 has an intermediate section 150, opposed strain relief coupling sections 152A, 152B, and opposed jacket coupling sections 156A, 156B. The sections 150, 152A, 152B, 154A, 154B are axially aligned. Each of the sections 152A, 152B includes a plurality of integral serrations or teeth 154 separated by slots 155 spaced apart along the axis A-A. According to some embodiments, the teeth 154 extend laterally or radially with respect to the axis A-A. According to some embodiments and as shown, the teeth 154 are serially aligned. According to some embodiments, each slot 155 is U-shaped (i.e., has a curved or rounded base), for example, as shown in FIG. 19.

Opposed extension walls 143 extend along the intermediate portion 150 and laterally (i.e., radially or heightwise) above or beyond the strain relief coupling sections 152A, 152B. As illustrated, the ends of the extension walls 143 may be angled to taper down to the adjacent sections 152A, 152B. According to some embodiments, the extension walls 143 have a height of between about 0.025 and 0.045 inch above the strain relief coupling sections 152A, 152B.

The bridge member 140 may be formed of any suitable material. According to some embodiments, the bridge member 140 is formed of a rigid or semi-rigid material. According to some embodiments, the bridge member has a modulus of rigidity of at least about $3 \times 10^6$ pounds/square inch, according to some embodiments, between about $3 \times 10^6$ pounds/square inch and $4 \times 10^6$ pounds/square inch and, according to some embodiments, of about $3.8 \times 10^6$ pounds/square inch. According to some embodiments, the bridge member 140 is formed of metal. According to some embodiments, the bridge member 140 is formed of aluminum or stainless steel. According to some embodiments, the bridge member 140 is formed of 6061-T6 aluminum. According to some embodiments, the bridge member 140 is formed of POM or PBT. The bridge member 140 may be formed using any suitable technique. According to some embodiments, the bridge member 140 is cast, stamped, extruded, injection molded, and/or machined. According to some embodiments, the bridge member is stamped and rolled. According to some embodiments, the bridge member 140 is unitarily formed.

Some or all of the tape pieces 160A, 160B, 162A, 162B, 164A, 164B may be constructed in the same manner. According to some embodiments, the tape pieces are polymeric, self-adhesive tapes (e.g., tapes generally referred to as electrical tape). According to some embodiments, the tapes are vinyl self-adhesive tapes.

The enclosure assembly 100 and the cordage assembly 7 may be assembled as follows in accordance with embodiments of the present invention. It will be appreciated that the order of certain of the steps may be different from the order of the description below. Moreover, it will be appreciated that certain of the steps may be omitted in accordance with further embodiments of the present invention.

Figure 2:
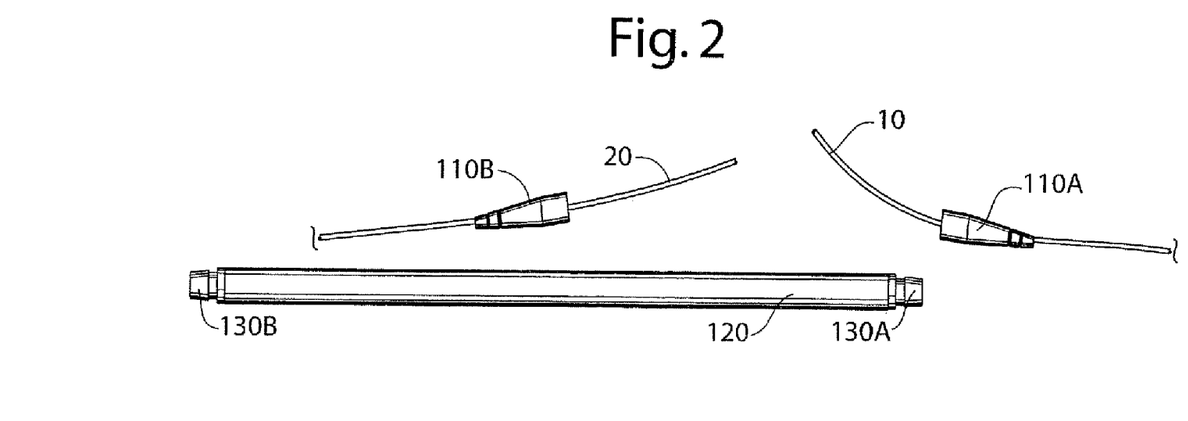
FIGS. 2-10 illustrate steps for assembling the enclosed splice assembly of FIG. 1 according to embodiments of the present invention.
Figure 3:
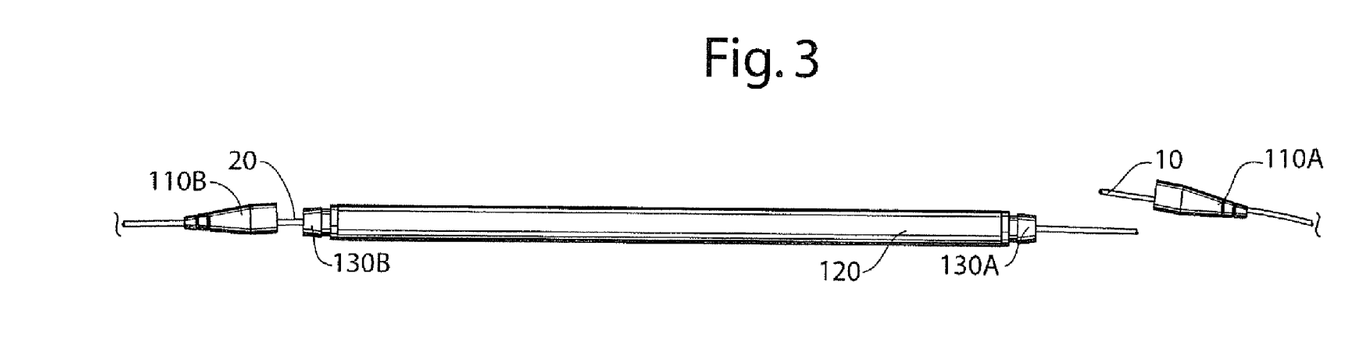

The end boots 110A, 110B are slid onto respective ones of the cords 10 and 20, respectively, and set back a distance from the ends of the cords 10, 20 as shown in FIG. 2. The coupling members 130A, 130B are inserted into the end openings 124A, 124B of the tubular cover member 120 as shown in FIG. 2. The coupling members 130A, 130B are retained in the passage 122 by the inserted tapered barb sections 135 and over-insertion is limited by the flanges 136. The combined cover member 120 and coupling members 130A, 130B are slid onto the cord 20 such that the cord 20 extends through the passages 122, 132 as shown in FIG. 3.

The cords 10, 20 are prepared and the fibers 12, 22 are spliced by any suitable technique. According to some embodiments, the cords 10, 20 are prepared in the following manner. A section of each jacket 16, 26 is removed to provide a section of the strength yarns 14, 24 and a section of the fiber 12, 22 extending beyond the end of the jacket 16, 26. The strength members 14, 24 are trimmed and the fibers 12, 22 are cut and cleaved, such that a section of each fiber 12, 22 extends beyond the ends of the respective strength members 14, 24. Thus, in the prepared cords, the strength members 14, 24 extend beyond the jackets 16, 26 a prescribed distance, and the fibers 12, 22 terminate with cleaved fiber ends. Also, the fibers 12, 22 may extend beyond the strength members 14, 24 a prescribed distance.

Figure 4:
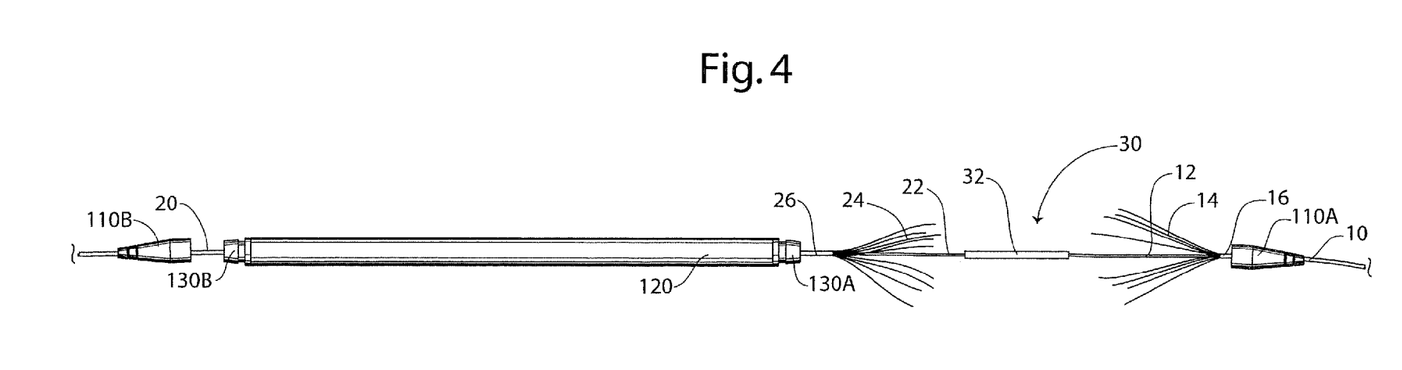

The ends of the fibers 12, 22 are then spliced by any suitable technique. According to some embodiments, a splice assembly 30 (FIG. 4) is formed including the fiber ends in spliced end abutment and a splice protection device or sleeve 32 surrounding the abutment and the adjoining sections of the fibers 12, 22. For example, the fibers 12, 22 can be fused and the device 32 then installed thereabout. Additionally or alternatively, the device 32 can include a mechanism or feature to mechanically hold the fiber ends in abutment. Suitable mechanical splice protection devices for the device 32 may include a RECORDsplice™ device available from Tyco Electronics, Inc. The device 32 may be a heat shrinkable sleeve. According to some embodiments, the strength members 14, 24 are free of the device 32.

Figure 5:
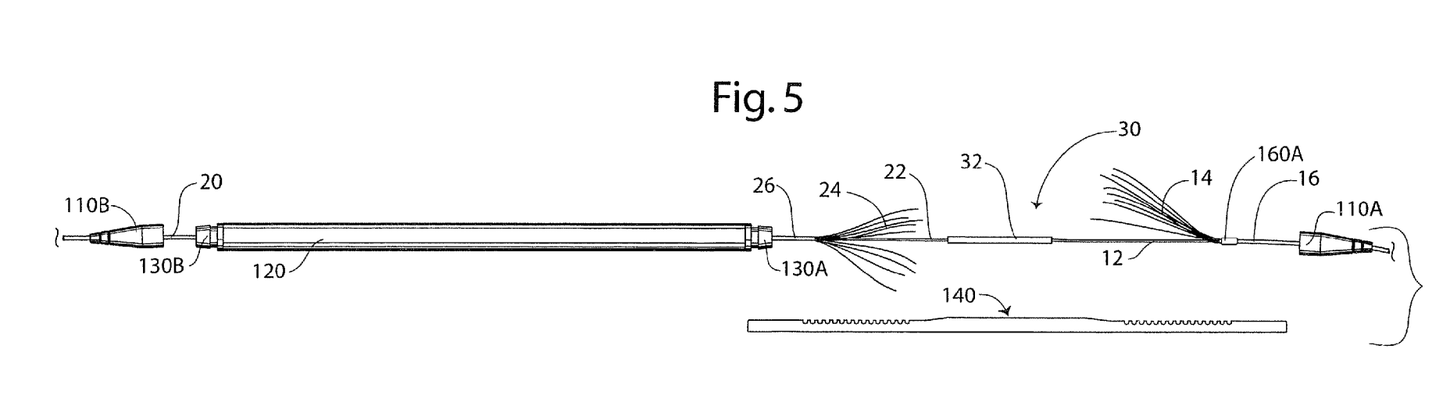
Figure 6:
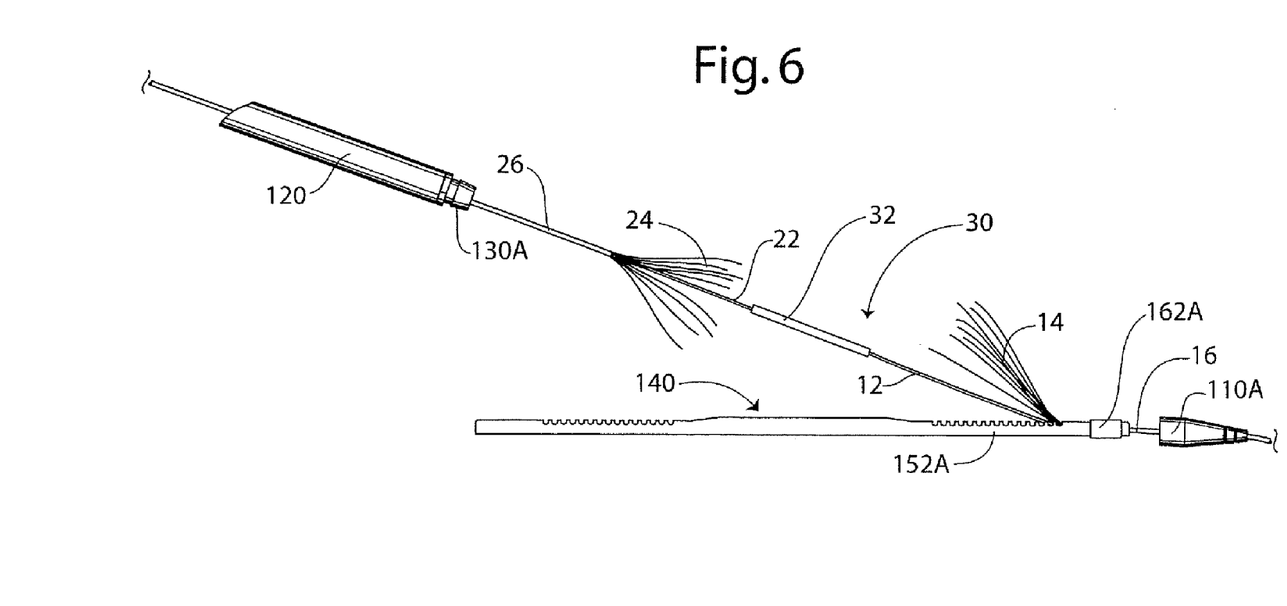

The bridge member 140 is then mounted on or coupled to the cords 10, 20. According to some embodiments, the jacket tape piece 160A is wrapped around the jacket 16 adjacent the end of the jacket 16 to build up the outer diameter of the jacket 16 to a prescribed diameter as shown in FIG. 5. The taped section of the jacket 16 is then inserted into the channel 144 in the jacket coupling section 156A of the bridge member 140 where the tape piece 160A provides an interference fit with the bridge member 140. The tape piece 162A is then wrapped about the jacket coupling section 156A and the jacket 16 as shown in FIG. 6 to secure the bridge member 140 to the jacket 16. In this manner, the bridge member 140 can be held to the cords 10, 20 to facilitate execution of subsequent assembly steps. The tape 160A may resist rotation of the bridge member 140 about the cord 10.

Figure 7:
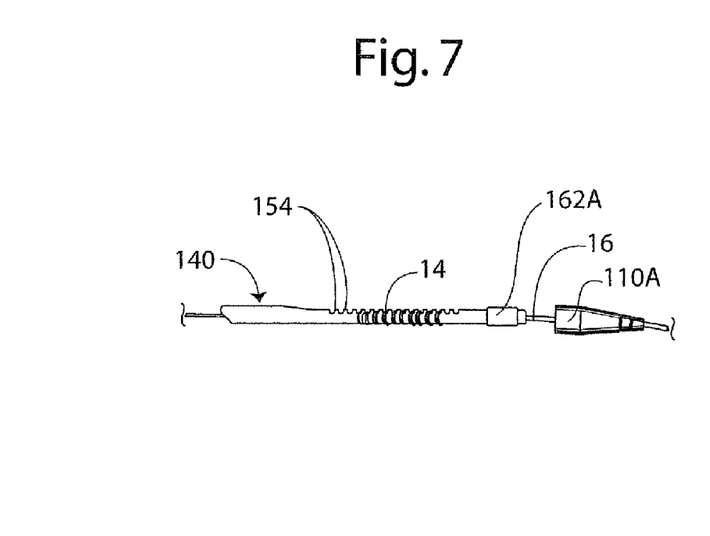
Figure 8:
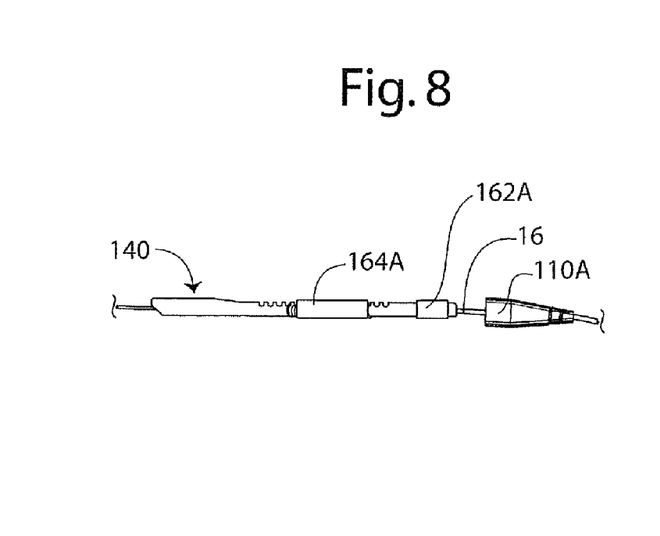

The fiber 12, the fiber 22 and the splice protection device 32 are then laid into the channel 144 of the bridge member 140 in the intermediate section 150. The yarns 14 are wrapped around the strain relief coupling section 152A, generally circumferentially about the axis A-A, so that segments of the strength members 14 are received in the slots 155 to interlock with the teeth 154 (as shown in FIG. 7). The tape piece 164A is then wrapped about the strength members 14 and the section 152A to secure the strength members 14 in the slots 155, as shown in FIG. 8.

The bridge member 140 is then secured to the cord 20 in the same manner as just described for securing the bridge member 140 to the cord 10, as shown in FIG. 9. The section 156B (FIG. 16) is secured to the jacket 26 by the tape pieces 160B, 162B, and the strength members 24 are wrapped about the section 152B (FIG. 16) and secured by the tape piece 164B.

Figure 10:
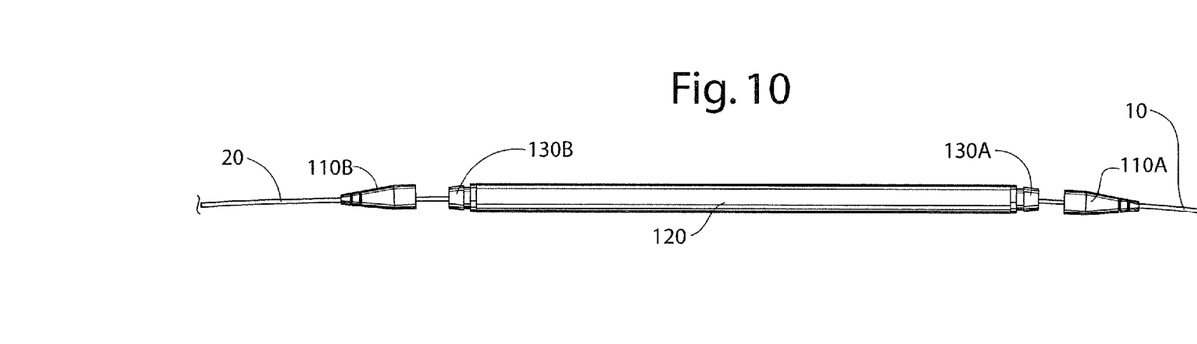

With the cord 10, the cord 20 and the splice protection device 32 secured to the bridge member 140 as described, the tubular cover member 120 is slid over the bridge member 140 as shown in FIG. 10. According to some embodiments, the side walls 145 (including the extension walls 143) extending along the intermediate section 150 extend across substantially the full inner diameter of the passage 122 to limit movement between the bridge member 140 and the cover member 120. According to some embodiments, end portions (e.g., the sections 156A, 156B) of the bridge member 140 are received in the coupling members 130A, 130B. According to some embodiments, the ends 148A, 148B extend to or closely adjacent to the outer ends of the coupling members 130A, 130B. The boots 110A, 110B are slid inwardly to receive and interlock with the outer barbed sections 135 of the coupling members 130A, 130B, thereby coupling the boots 110A, 110B to the cover member 130 as shown in FIG. 11. The enclosure assembly 100 is, thus, assembled.

The tubular cover member 120 may be retained in place relative to the bridge member 140 by the boots 110A, 110B, by an interference fit with the bridge member, by an interference fit between the bridge member 140 and the coupling members 130A, 130B (which may be provided or augmented by the tape pieces 162A, 162B), and/or by an interference fit between the boots 110A, 110B and the jackets 16, 26. The splice protection device 32 (and, hence, the splice point) may be retained in place relative to the bridge member 140 by the engagement between the strength members 14, 24 and the strain relief coupling sections 152A, 152B.

The engagement between the strength members 14, 24 and the strain relief coupling sections 152A, 152B may provide strain relief between the cords 10, 20, thereby relieving stress on the splice. The bridge member 140 also may support the splice and resist bending of the splice and the splice protection device 32. The strength members 14, 24 may be selectively and effectively preloaded against pullout of the cords 10, 20 by wrapping the strength members 14, 24 about the sections 152A, 152B to an appropriate tightness.

The bridge member 140 and the tubular cover member 120 may provide environmental protection for the splice. According to some embodiments, the enclosure assembly 100 is environmentally sealed.

The enclosure assembly 100 may provide a low profile and small size and/or volume so that the splice may be more easily accommodated. For example, the enclosure assembly 100 may permit the cords and splice to be pulled through raceways and the like. According to some embodiments and as shown, the enclosure assembly 100 has a generally smooth outer profile that does not present corners or other features that might snag on adjacent structures in the environment. The tapered boots 110A, 110B may provide smooth transitions between the cords 10, 20 and the greater diameter of the cover member 120.

The enclosure assembly 100 may serve to limit the minimum bend radius of the fibers entering the enclosure assembly 100. More particularly, the boots 110A, 110B may be configured and constructed to limit the minimum bend radius of the fibers 12, 22. According to some embodiments, each boot 110A, 110B limits the bend radius of the corresponding fiber 12, 22 to a minimum bend radius of no less than about 1.5 inches at a nominal five pound side load (i.e., perpendicular to the axis A-A).

Assembly and mounting of the enclosure assembly 100 may require no special tools or skills. Therefore, the enclosure assembly 100 of the present invention may be particularly well-suited for use in the field and by less skilled technicians. Notably, the manner in which the bridge member 140 receives and couples with the several components of the cord 10, 20 may not require a high level of precision in preparing the cords 10, 20 or in placing the cords 10, 20 or the splice protection device 32 in the bridge member 140. The lengths of the sections 152A, 152B may compensate for inaccuracies in the cable preparation or cord stripping length, thus ensuring the fibers are not bunched together or pulled overly tight, either of which may put undue stress on the fibers and/or the splice.

The enclosure assembly 100 may be used for reconstituting or extending any suitable cabling or cordage. In particular, the enclosure assembly 100 can be used to reconstitute one or two pieces of pigtail cordage. For example, the enclosure assembly 100 may be used to add a further length of cord to a pigtail (i.e., a cord having a connector termination on one end). The enclosure assembly 100 may be used to join two pigtails together to form a jumper (i.e., a cord connectorized on both ends). Thus, the enclosure assembly 100 may allow a technician to cut two pigtails to length and splice the pigtails together to form a jumper of a selected variable length.

The enclosure assembly 100 may be used to enclose an in-line splice such as a repair splice. Two of the enclosure assemblies 100 may be used to enclose each splice point of a bridge splice.

The enclosure assembly 100 can accommodate multiple different sizes of cordage. More particularly, in each boot 110A, 110B the passage 112A may be sized to fit a first diameter cord, the passage 112B may be sized to fit a second diameter cord, and the passage 112C may be sized to fit a third diameter cord. If desired, the installer can adapt either of the boots 110A, 110B to fit the diameter of the cord being installed through that boot by cutting off the section or sections 114A, 114B, 144C having an inner diameter that is undersized for the cord. The boots 110A and 110B can be independently configured (i.e., each adapted to fit a different size cord by selective trimming). According to some embodiments, the passage 112A is sized to fit and form a seal about a 1.6 mm diameter cord, the passage 112B is sized to fit and form a seal about a 2 mm diameter cord, and the passage 112C is sized to fit and form a seal about a 3 mm diameter cord. The channel 144 of the bridge member 140 can be sized to fit a range of sizes of cords and splice protection devices 32.

The enclosure assembly 100 may be re-enterable and reusable. If desired, a technician may pull one of the end boots 110A, 110B off of its coupling member 130A, 130B and pull the cords 10, 20, the splice assembly 30 and the bridge member 140 out of the tubular cover member 120 as a unit. The technician can disassemble the bridge member 140 from the cords 10, 20 by removing the tape pieces and unwrapping the strength members 14, 24 from the sections 152A, 152B. The enclosure assembly 100 can then be reused for one or more new cords, or to couple and cover a new splice of the same two cords 10, 20. In either case, the enclosure assembly 100 can be reassembled and reinstalled in the same manner as described above.

According to further embodiments of the present invention, the boots 110A, 110B, the cover member 120, and the coupling members 130A, 130B may be omitted and another covering member or members may be used in their place. According to some embodiments, a wrap preformed as a spirally wound web may be wrapped about the cords 10, 20 and the splice assembly 30 after the bridge member 140 has been mounted on the cords 10, 20 as described above. The spiral wrap may be secured in place by tape adhering to the ends of the wrap and the adjacent portions of the jackets 16, 26, for example. Suitable spiral wraps may include, for example, a spirally wound web of PVC or nylon having a thickness of between about 0.02 and 0.08 inch.

Various further modifications may be made in accordance with embodiments of the present invention. For example, the coupling members 130A, 130B may be integrally molded with the cover member 120. The strain relief coupling sections 152A, 152B of the bridge member 140 may be replaced or augmented with other securing structures and/or features adapted to engage and retain the strength members 14, 24.

According to some embodiments, the total volume of the enclosure assembly 100 is no more than about 2.1 cubic inches and, according to some embodiments, no more than about 0.67 cubic inches.

According to some embodiments, the length L1 (FIG. 17) of the bridge member 140 is between about 6 and 10.5 inches. According to some embodiments, the overall height H1 (FIG. 18) of the bridge member 140 is between about 0.150 and 0.200 inch. According to some embodiments, the width W1 (FIG. 18) of the bridge member 140 is between about 0.150 and 0.200 inch. According to some embodiments, the thickness T (FIG. 18) of the bridge member 140 is between about 0.02 and 0.04 inch. According to some embodiments, neither the height H1 nor the width W1 of the bridge member 140 exceeds 0.25 inch. According to some embodiments, the ratio of the length L1 to the height H1 is at least 1 to 40. According to some embodiments, the depth H2 (FIG. 18) of the channel 144 is between about 0.130 and 0.160 inch. According to some embodiments, the radius of curvature R (FIG. 18) of the bridge member 140 is between about 0.075 and 0.100 inch. According to some embodiments, the length L2 (FIG. 17) of the intermediate section 150 is between about 1.5 and 6 inches. According to some embodiments, the length L3 (FIG. 17) of each of the strain relief coupling sections 152A, 152B is between about 1.188 and 1.500 inches. According to some embodiments, the length L4 (FIG. 17) of the jacket coupling sections 156A, 156B is between about 0.95 and 1.05 inches. According to some embodiments, the width W2 (FIG. 19) of each tooth 154 is between about 0.030 and 0.060 inch and the width W3 of each slot 155 is between about 0.020 and 0.060 inch. According to some embodiments, the height H3 of each tooth 154 is between about 0.040 and 0.060 inch.

According to some embodiments, each section 152A, 152B includes between about 15 and 30 teeth 154.

According to some embodiments, the length L5 (FIG. 11) of the overall enclosure assembly 100 is between about 8.25 and 12.75 inches. According to some embodiments, the maximum diameter of the enclosure assembly 100 is no more than 0.5 inch and, according to some embodiments, is between about 0.356 and 0.394 inch. According to some embodiments, the ratio of the length L5 to the maximum diameter of the enclosure assembly 100 is at least 1 to 25.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A splice enclosure assembly for enclosing a splice between first and second fiber optic cables, the first and second fiber optic cables each having a jacket and an elongate optical fiber and at least one flexible, elongate strength member extending through the jacket, the splice enclosure assembly comprising:
- a) an elongate bridge member having first and second opposed ends, the bridge member defining a channel extending axially between the first and second ends and including:
  - an intermediate portion disposed between the first and second ends and having an intermediate portion of the channel defined therein, wherein the bridge member is configured to receive the first and second fiber optic cables in the channel such that the splice is disposed in the intermediate portion of the channel; and
  - first and second strain relief coupling structures located on opposed sides of the intermediate portion, wherein the first and second strain relief coupling structures are configured to engage and secure the strength members of the first and second fiber optic cables to the bridge member and thereby mechanically couple the first and second fiber optic cables to one another and to the bridge member; and
- b) an elongate cover member configured to surround the bridge member, the first and second fiber optic cables and the splice when the first and second fiber optic cables are disposed in the channel and the strength members of the first and second fiber optic cables are engaged with the first and second strain relief coupling structures;
- wherein the first and second strain relief coupling structures each include a plurality of teeth defining a plurality of slots configured to receive portions of the strength members of the first and second fiber optic cables when the strength members of the first and second fiber optic cables are wound about the bridge member; and wherein the bridge member is substantially U-shaped in cross-section and defines an axially extending opening in communication with the channel.

2. The assembly of claim 1 wherein the slots of the plurality of slots of each of the first and second strain relief coupling structures have a width in the range of between about 0.020 and 0.060 inch.

3. The assembly of claim 1 wherein the bridge member includes opposed, axially extending side extension walls extending along the intermediate portion and laterally beyond the first and second strain relief coupling structures.

4. The assembly of claim 1 wherein the bridge member has a modulus of rigidity of at least about $3 \times 10^6$ pounds/square inch.

5. The assembly of claim 1 wherein the bridge member is formed of metal.

6. The assembly of claim 1 including first and second flexible end boots defining first and second boot passages through which the first and second fiber optic cables extend, respectively, wherein the first and second end boots are mounted proximate the first and second ends of the bridge member and taper from the cover member to the first and second fiber optic cables, respectively.

7. The assembly of claim 6 wherein each of the first and second end boots is configured such that the boot passage thereof includes a plurality of passage sections of different diameters corresponding to fiber optic cables of different diameters.

8. The assembly of claim 6 further including first and second coupling members coupling the first and second end boots to first and second ends of the cover member, respectively.

9. The assembly of claim 6 wherein each of the first and second end boots is configured to limit the bend radius of a fiber portion extending therethrough to a minimum bend radius of no less than about 1.5 inches at a nominal five pound side load.

10. The assembly of claim 1 including first and second tape members adapted to secure portions of the strength members of the first and second fiber optic cables in place when the portions of the strength members of the first and second fiber optic cables are engaged with the first and second strain relief coupling structures.

11. The assembly of claim 1 including a tape member adapted to be mounted on a jacket of at least one of the first and second fiber optic cables to provide an interference fit between the jacket and the bridge member.

12. The assembly of claim 1 including a tape member adapted to adhesively secure the jacket of at least one of the first and second fiber optic cables to the bridge member.

13. An enclosed splice assembly comprising:
- a) first and second fiber optic cables, the first and second fiber optic cables each having a jacket and an elongate optical fiber and at least one flexible, elongate strength member extending through the jacket;
- b) a splice between the optical fibers of the first and second fiber optic cables;
- c) an elongate bridge member having first and second opposed ends, the bridge member defining a channel extending axially between the first and second ends and including:
  - an intermediate portion disposed between the first and second ends and having an intermediate portion of the channel defined therein, wherein the first and second fiber optic cables and the splice are positioned in the channel such that the splice is disposed in the intermediate portion of the channel; and
  - first and second strain relief coupling structures located on opposed sides of the intermediate portion, wherein the strength members of the first and second fiber optic cables engage the first and second strain relief coupling structures, respectively, to secure the first and second fiber optic cables to the bridge member and thereby mechanically couple the first and second fiber optic cables to one another and to the bridge member; and
- d) an elongate cover member surrounding the bridge member, the first and second fiber optic cables and the splice;
- wherein the first and second strain relief coupling structures each include a plurality of teeth defining a plurality of slots and the strength members of the first and second fiber optic cables are wound about the bridge member such that portions of the strength members of the first and second fiber optic cables are received in the slots; and wherein the bridge member is substantially U-shaped in cross-section and defines an axially extending opening in communication with the channel.

14. The assembly of claim 13 including first and second tape members overlying portions of the strength members of the first and second fiber optic cables engaging the first and second strain relief coupling structures to secure the strength members in place.

15. The assembly of claim 13 including a tape member on the jacket of at least one of the first and second fiber optic cables, wherein the tape member provides an interference fit between the at least one of the first and second fiber optic cables and the bridge member.

16. The assembly of claim 13 including a tape member adhesively securing the jacket of at least one of the first and second fiber optic cables to the bridge member.

17. A method for forming an enclosed splice assembly joining first and second fiber optic cables, the first and second fiber optic cables each having a jacket and an elongate optical fiber and at least one flexible, elongate strength member extending through the jacket, the method comprising:
  providing an elongate cover member and an elongate bridge member, the bridge member having first and second opposed ends, defining a channel extending axially between the first and second ends and including an intermediate portion disposed between the first and second ends, an intermediate portion of the channel defined therein, and first and second strain relief coupling structures located on opposed sides of the intermediate portion;
  forming a splice between the optical fibers of the first and second fiber optic cables;
  positioning the splice and the first and second fiber optic cables in the channel of the bridge member such that the splice is disposed in the intermediate portion of the channel;
  engaging the strength members of the first and second fiber optic cables with the first and second strain relief coupling structures, respectively, to secure the first and second fiber optic cables to the bridge member and thereby mechanically couple the first and second fiber optic cables to one another and to the bridge member; and
  placing the elongate cover member over the bridge member, the first and second fiber optic cables and the splice such that the elongate cover member surrounds the bridge member;
  wherein the first and second strain relief coupling structures each include a plurality of teeth defining a plurality of slots, and including winding the strength members of the first and second fiber optic cables about the bridge member such that portions of the strength members of the first and second fiber optic cables are received in the slots.

18. The method of claim 17 including mounting first and second flexible end boots proximate the first and second ends of the bridge member and on the first and second fiber optic cables such that the first and second fiber optic cables extend through boot passages of the first and second end boots, respectively, and the first and second end boots taper from the cover member to the first and second fiber optic cables, respectively.

19. The method of claim 18 wherein each of the first and second end boots is configured such that the boot passage thereof includes a plurality of passage sections of different diameters corresponding to fiber optic cables of different diameters, and including cuffing at least one of the first and second end boots to remove one or more of the plurality of passage sections.

20. The method of claim 18 wherein each of the first and second end boots is configured to limit the bend radius of the fiber portion extending therethrough to a minimum bend radius of no less than about 1.5 inches at a nominal five pound side load.

21. The method of claim 17 further including coupling the first and second end boots to first and second ends of the cover member, respectively, using first and second coupling members.

22. The method of claim 17 including placing first and second tape members over portions of the strength members of the first and second fiber optic cables engaging the first and second strain relief coupling structures to secure the strength members in place.

23. The method of claim 17 including placing a tape member on the jacket of at least one of the first and second fiber optic cables such that the tape member provides an interference fit between the at least one of the first and second fiber optic cables and the bridge member when the at least one of the first and second fiber optic cables is positioned in the channel.

24. A splice enclosure assembly for enclosing a splice between first and second fiber optic cables, the first and second fiber optic cables each having a jacket and an elongate optical fiber and at least one flexible, elongate strength member extending through the jacket, the splice enclosure assembly comprising:
  a) an elongate bridge member having first and second opposed ends, the bridge member defining a channel extending axially between the first and second ends and including:
    an intermediate portion disposed between the first and second ends and having an intermediate portion of the channel defined therein, wherein the bridge member is configured to receive the first and second fiber optic cables in the channel such that the splice is disposed in the intermediate portion of the channel; and
    first and second strain relief coupling structures located on opposed sides of the intermediate portion, wherein the first and second strain relief coupling structures are configured to engage and secure the strength members of the first and second fiber optic cables to the bridge member and thereby mechanically couple the first and second fiber optic cables to one another and to the bridge member; and
  b) an elongate cover member configured to surround the bridge member, the first and second fiber optic cables and the splice when the first and second fiber optic cables are disposed in the channel and the strength members of the first and second fiber optic cables are engaged with the first and second strain relief coupling structures;
  c) first and second flexible end boots defining first and second boot passages through which the first and second fiber optic cables extend, respectively, wherein the first and second end boots are mounted proximate the first and second ends of the bridge member and taper from the cover member to the first and second fiber optic cables, respectively;
  wherein each of the first and second end boots is configured such that the boot passage thereof includes a plurality of passage sections of different diameters corresponding to fiber optic cables of different diameters.

25. A method for forming an enclosed splice assembly joining first and second fiber optic cables, the first and second fiber optic cables each having a jacket and an elongate optical fiber and at least one flexible, elongate strength member extending through the jacket, the method comprising:
  providing an elongate cover member and an elongate bridge member, the bridge member having first and second opposed ends, defining a channel extending axially between the first and second ends and including an intermediate portion disposed between the first and second ends, an intermediate portion of the channel defined therein, and first and second strain relief coupling structures located on opposed sides of the intermediate portion;
  forming a splice between the optical fibers of the first and second fiber optic cables;

positioning the splice and the first and second fiber optic cables in the channel of the bridge member such that the splice is disposed in the intermediate portion of the channel;

engaging the strength members of the first and second fiber optic cables with the first and second strain relief coupling structures, respectively, to secure the first and second fiber optic cables to the bridge member and thereby mechanically couple the first and second fiber optic cables to one another and to the bridge member; and placing the elongate cover member over the bridge member, the first and second fiber optic cables and the splice;

mounting first and second flexible end boots proximate the first and second ends of the bridge member and on the first and second fiber optic cables such that the first and second fiber optic cables extend through boot passages of the first and second end boots, respectively, and the first and second end boots taper from the cover member to the first and second fiber optic cables, respectively;

wherein each of the first and second end boots is configured such that the boot passage thereof includes a plurality of passage sections of different diameters corresponding to fiber optic cables of different diameters, and including cutting at least one of the first and second end boots to remove one or more of the plurality of passage sections.

* * * * *